(12) United States Patent
Lin et al.

(10) Patent No.: US 6,405,325 B1
(45) Date of Patent: Jun. 11, 2002

(54) METHOD AND TOOL FOR RESTORING CRASHED OPERATION SYSTEM OF COMPUTER

(75) Inventors: Kuang Shin Lin; Tong S Chen, both of Taipei (TW); Gang Fan, Tianjin (CN); Jian Wu, Tianjin (CN); Lin Wang, Tianjin (CN)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/240,796

(22) Filed: Jan. 30, 1999

(51) Int. Cl.[7] .......................... G06F 17/30; G06F 11/00
(52) U.S. Cl. ..................... 714/15; 714/2; 707/200
(58) Field of Search ................. 714/15, 2, 7; 713/1, 713/2, 100; 707/200, 3, 203, 205, 101

(56) References Cited

U.S. PATENT DOCUMENTS 5,307,494 A * 4/1994 Yasumatsu et al.
5,745,902 A * 4/1998 Miller et al.
5,754,848 A * 5/1998 Hanes
5,765,169 A * 6/1998 Conner
6,286,013 B1 * 9/2001 Reynolds et al.

* cited by examiner

Primary Examiner—Gopal C. Ray
(74) Attorney, Agent, or Firm—W. Wayne Liauh

(57) ABSTRACT

The present invention provides a method and tool for restoring a crashed operation system of a computer, for example, by operating under DOS environment to restore a crashed Windows system without requiring a long time setup and reinstallation. According to the present invention, a matching table for short file names to long file names is established for all files (containing directory names) on a disk. Then the long file names can be retrieved from short file names in accordance with the matching table. Since the long file names are stored in Unicode, they are workable for operation systems of any language.

17 Claims, 4 Drawing Sheets

METHOD AND TOOL FOR RESTORING CRASHED OPERATION SYSTEM OF COMPUTER

BACKGROUND OF THE INVENTION

The present invention relates to a method and tool for the restoration of crashed computer operating systems. The method and tool of the present invention can be used in computer operation systems of different languages, and can be operated under the DOS environment to restore a crashed system to its original state as prior to the crash.

The so-call "operation system" is a system software for controlling the hardware and software resources of computer. The function of an operation system is to manipulate and harmonize of the hardware and software of the computer. In other words, a computer functions only when an operation system is executed. Examples of the operation system include the underlying DOS (Disk Operation System) and the Microsoft Windows both are mainstreams of the current personal computer systems. When the operation system crashes, it will no longer work for the user. Therefore, one of the main functions of the present invention is to provide a method for solving the problem of a crashed Windows system.

Under the conventional computers' operation environment, the crashed operation system could not to full restored to its original state as before the crash. Under the Windows system, as an example, after a crash the user may run the Setup/Install function in the Microsoft Wizard" software, reply and answers rightly to the hints and questions it provides, only then could a new operation system be reinstalled successfully. But this is not the same system as before the crash. The installation process depends on the user who knows about computer to a certain extent. It is not an easy way. Furthermore, the installation takes a long time, for example, about 20 minutes for Windows 95; and more than one hour for Windows 98. More to the point, the system is not restored specially to the previous state as before the crash.

After a Windows system crashes, only the basic DOS system remains for use. But the DOS system does not support the long file name; hence, the long file names created under Windows cannot be handled or restored under DOS. It is also another problem that under the Chinese or other language versions of the Windows operation system, the file names or directories using the non-English language cannot be restored under the pure English DOS system. To solve this problem, the conventional method is to obtain a short or long file name just under that specific language operation system. This often involves tedious and costly work.

A primary objective of the present inventions to provide an easy and fast method for restoring an extended operation system containing long file names under basic DOS environment, rather than requiring a long time setup and reinstallation.

According to the present invention, a matching table for short file names to long file names is established for the whole files (containing directory names) on a disk. Then the long file names can be retrieved from short file names in accordance with the matching table so as to solve the problem of the DOS that does not support long file names.

Another objective of the present invention is to provide a tool in the DOS environment for restoring a computer operation system that contains long file names.

According to the present invention, a restoration tool is to provide a recording media for the computer, such as an optic disk or a magnetic disk, for storing matching tables of short to long file names established before the operation system crashes, and the machine code instructions (driver program) for the computer to execute a restoration. Therefore, after a Windows system crashes, the user can restore the Windows under the DOS system. Even the long file names under different operation systems can be recognized and retrieved correctly. In addition, since the restoration is working under a basic DOS system, it is fast and requires only 20 minutes.

The matching table for short to long file names is established under Unicode which is compatible with different operation systems of different language.

The objectives and advantages of the present invention will become apparent from a detailed description provided below, with reference to the accompanying drawings.

DETAILED DESCRIPTION OF PREFERRED EMBODIMENTS

The process according to the present invention includes the following steps:
   a) Searching the whole files, including directory names, from the disk which contains an extended operation system, such as Windows, to be restored, and establishing a matching table of short file names and corresponding long file names;
   b) Loading the matching table into the basic operation system, such as DOS, for restoration; and
   c) Restoring the original long file names from short file names according to the matching table, so as to solve the problem of the basic operation system that does not support long file names, and swiftly restore the crashed extended operation system (Windows) in the basic operation system (DOS).

The mentioned previously process includes a preparation process and a restoration process. In the preparation process, a file with matching table of short to long file names is established before the operation system crashes. The matching table contains data transformed from all the file names, including directory names, on the media handled by the operation system. The matching table is the tool for restoring the operation system.

In the restoration process, the matching table file is processed in the DOS environment for transforming short file names into long file names for the original operation system, such as Windows or other similar system, which contains the long file name structure.

Figure 1:
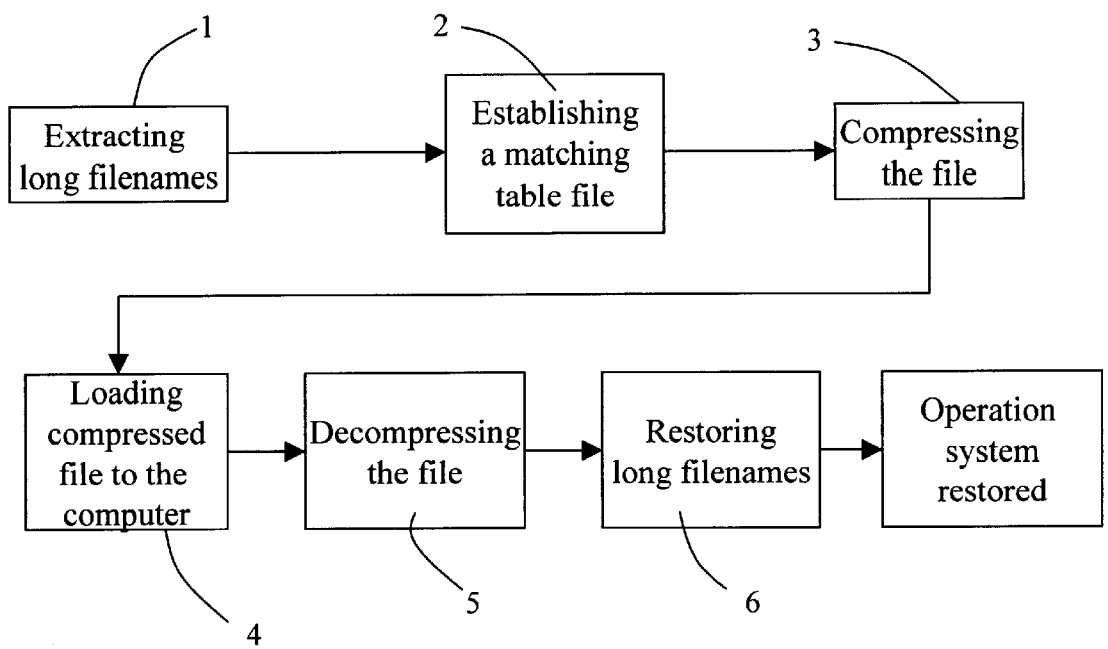
FIG. 1 is a flowchart showing the process of establishing a matching table and restoring an operation system according to the present invention.

Referring to FIG. 1, the process according to the present invention includes the following steps:
   1) Extracting long file names: To solve the problem of special characters in different language system, the present invention incorporates several different language operation system as "Slave" programs in an operation system, such as Windows NT 4.0 WK, which supports Unicode, the international character encoding standard for multiple language practices. By executing a searching process that will be described later, every long file name under its specific language system can be obtained;

2) Establishing a matching table file of short to long file names for the specific language system. The data structure of a matching table, as shown in Table A, includes data of a short file name with file path, a corresponding long file name, file attributes and other file parameters. Several matching tables incorporating with relative file contents are stored into a matching table file as shown in Table B.

Table A. Structure of a directory-matching table
Short file name (with file path) in OEM code
Long file name (without file path) in Unicode

| File attribute (4 bytes) | Time of file generated (8 bytes) | Time of file visited (8 bytes) | Time of file modified (8 bytes) |
|---|---|---|---|

Table B. Storage sequence of directories (matching tables) and files
First layer directory 1
   Second layer directory 1, . . .
   Second layer directory 2, . . .
   . . .
First layer directory 2
   . . .
All files in the first layer directory 1
   All files in the second layer directory 1, . . .
   All files in the Second layer directory 2, . . .
   . . .
All files in the first layer directory 2
   . . .

3) Compressing the matching table file into a Zip file as a restoration tool. The matching table file is compressed and stored into a medium, such as an optic disk or a magnetic disk together with some machine code instructions (driver program) for the computer to execute a restoration after a crash. For the purpose of a successful decompression, the compression is made under the same language system in which the decompression will be taken. Of course, if the compression is not needed the original matching table file and instruction codes will be stored and later decompression is not required.

4) Loading the Zip file to the DOS system under which the Window system has crashed. By opening the restoration tool under DOS, the Zip file of matching table file will be loaded into the computer. Since the data is transferred in the compressed format, it is works swiftly.

5) Decompressing the Zip file to fast retrieve the matching table file.

6) Restoring the long file names under the original operation system according to the matching table files. The restoration is accomplished automatically by the machine code instructions in the restoration tool.

The aforesaid steps 1 to 3 are preparation processes. In addition, steps 4 to 6 are restoration processes.

Figure 3:
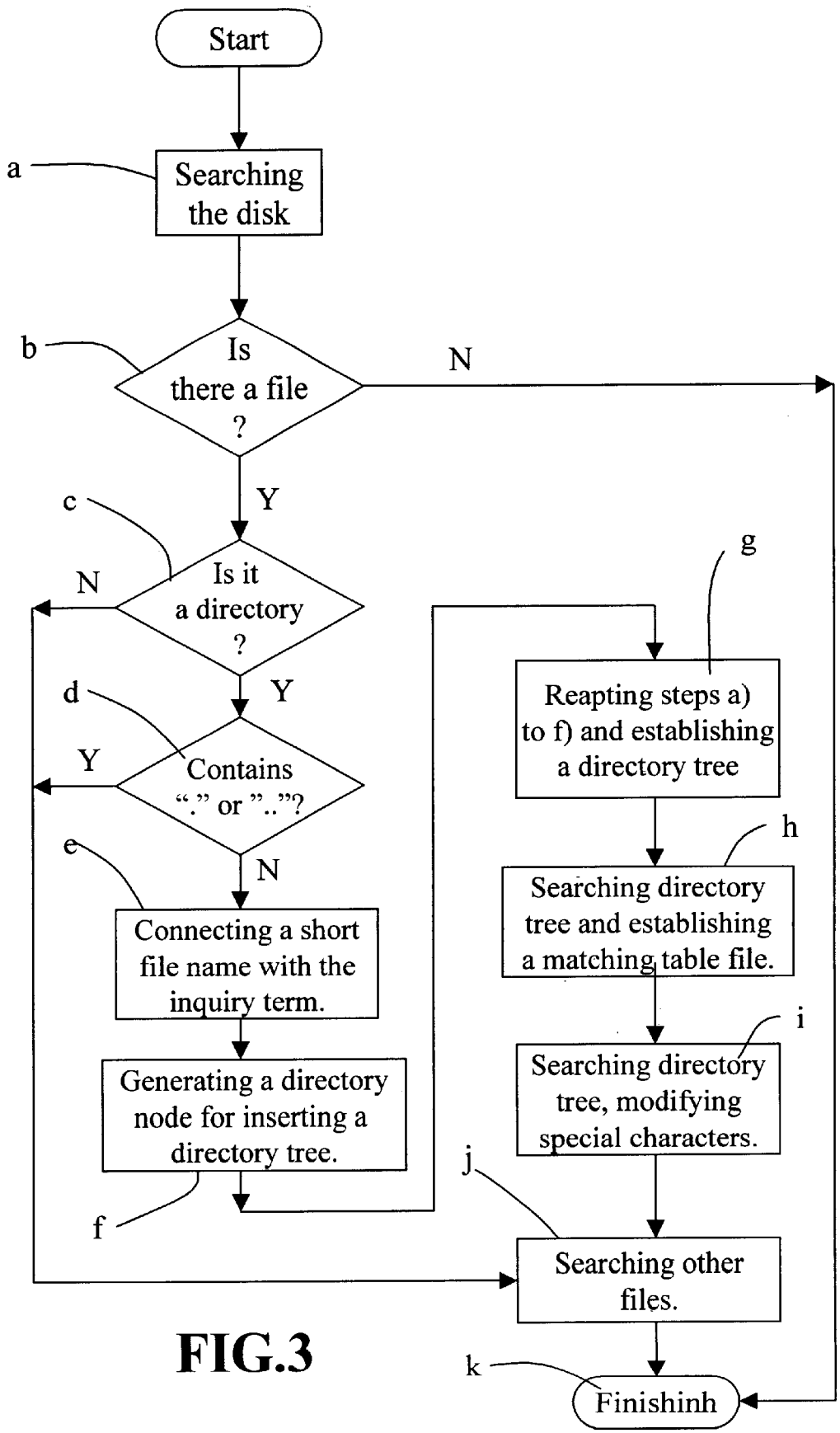
FIG. 3 is a detailed flowchart showing the preparation process of an embodiment of the present invention.

A detailed flowchart of the process of preparation process is shown in FIG. 3. It includes the following steps:

a) Searching the disk for an inquiry term: For example, if a system file (config) is to be searched, then confide" is the inquiry term;

b) Judging if a file exists: If yes, proceed to the next step, or go to step (k) Finishing; (Generally, the loop continues whenever another file or directory exists)

c) Judging if it is a directory: If yes, proceed to the next step, or jump to step (j); (In the embodiment, the present invention first searches a directory for establishing a directory tree, then establishes a matching table of short to long file names and their corresponding files according to the directory tree)

d) Judging if the name contains ". . . " or ". . . " format, if yes, jumps to step (j), or proceeds to the next step; (If the directory is not a format with dot, it is a long file name.)

e) Connecting a short file name with the inquiry term: (That is putting the inquiry term in the short file name, e.g., short file name=confide", so as to preserve the original directory name for the operation system of the computer.)

f) Generating a directory node for inserting a directory tree;

g) Using the directory node as a parent node for searching downward, its soon directories by repeating the step (a) to (f) and establishing a directory tree;

h) Searching the directory tree and establishing a matching table file, i.e., taking the file names in the directory tree and incorporating all the matching tables of short to long file names and the corresponding files:

I) Searching the directory tree and modifying codes of special characters;

j) Searching other files; and k) Finishing the preparation.

Figure 4:
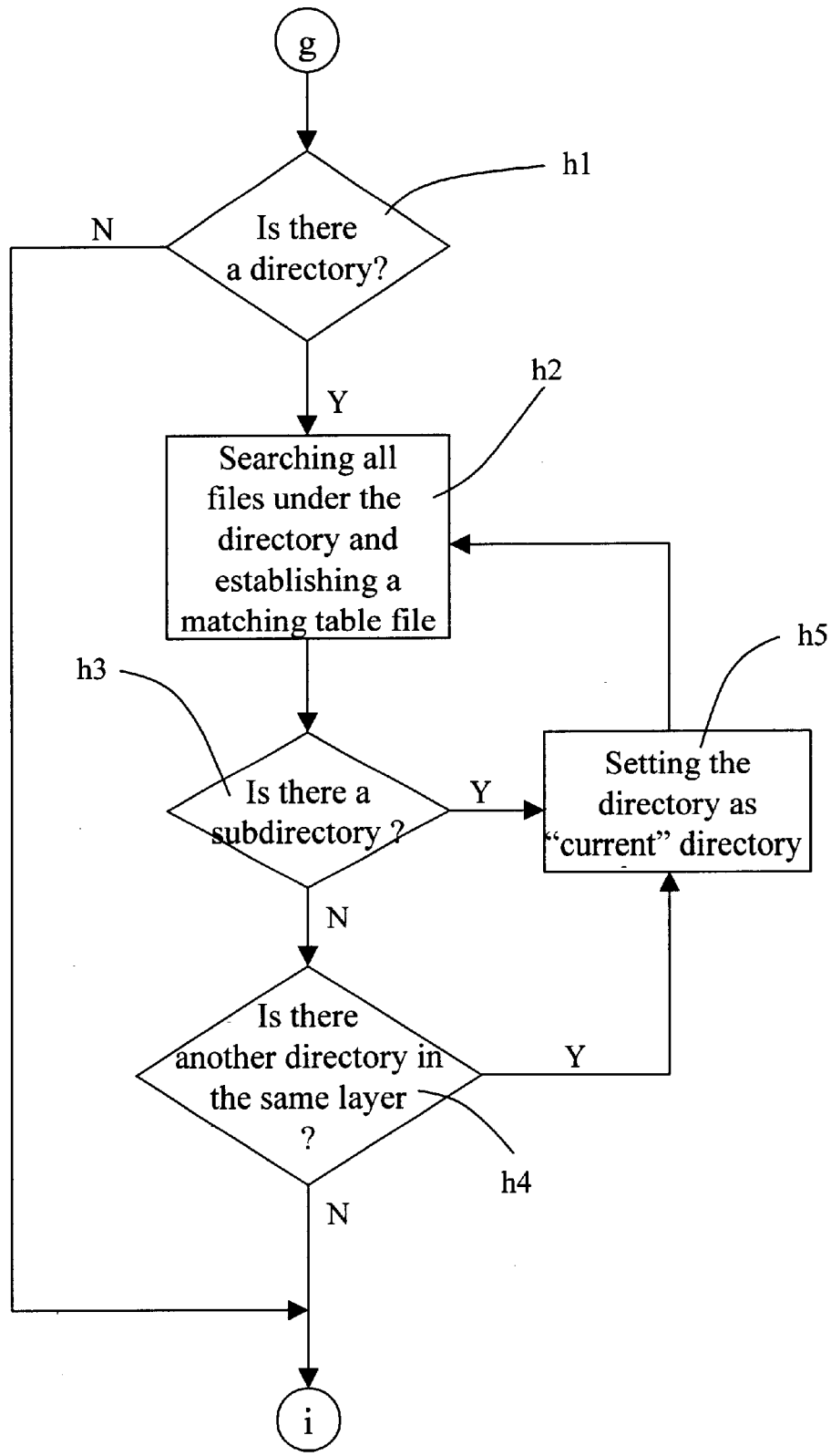
FIG. 4 is a further detailed flowchart showing the process of establishing a matching table.

As shown in FIG. 4, the detailed process in step (h) further includes the following steps:

h1) Judging if there is a directory in the directory tree, if yes, proceeds to step (h2), or jumps to step (i);

h2) Searching all the files under the directory and establishing a matching table file; (If there is a directory, scanning the files under the directory and establishing the long file names and short file names. For those short file names with non-ASCII codes, modify them according a predetermined rule of encoding according to the present invention)

h3) Judging if there is farther a son directory, if not, proceeds to step (h4), or jump to step (h5);

h4) Judging if there is another directory in the same layer, if yes, proceeds to step (h5), or jumps to step (i); and h5) Taking the directory as Current" directory, and jumps to step h2).

Basically, the aforesaid steps (h1) to (h5) are a Binary Tree Traversal. It searches the files one by one in a directory tree, which is found out by an inquiry term and established in step (g), for establishing a matching table file of short to long file names which can be used for restoration of operation system. Of course, any other searching method for finding out the files in the directory can be used and not limited to the previously mentioned method. Other binary tree traversal procedures can also be used.

According to the present invention, the long file names in a specific language during establishing the matching table is processed by an operation system as a data transformer or platform 30, such as WinNT 4.0 WK, which supports Unicode. The advantage of Unicode supportability of WinNT 4.0 WK, is that file names in different language can be correctly encoded into Unicode, the international standard coding system for compatibility of different languages. For example, for the file management of Window, the directory file names will be stored as follows:

a) Long file names are stored in Unicode; and b) Short file names are stored in OEM; the coding used in MS-DOS that has built-in hardware supported to allow rapid display of characters on the computer.

Therefore, file names in different languages can be taken, and short file names can be transformed into OEM codes and prevented from unrecognizable.

In the Previously Mentioned Table A, the data structure of a matching table of a short file name to a long file name is shown. The data of short file name is encoded and stored along with its file path in OEM code. The corresponding long file name stored in Unicode contains no path since it is only used for retrieving of the long file name. The file attributes (read-only, hidden, modified or system) are coded by numbers of four bytes. The other file parameters, including. Time when file is the generated, time when the file is visited and time when file is the modified are also recorded in the matching table since they are the necessary parameters of restoration.

Figure 5:
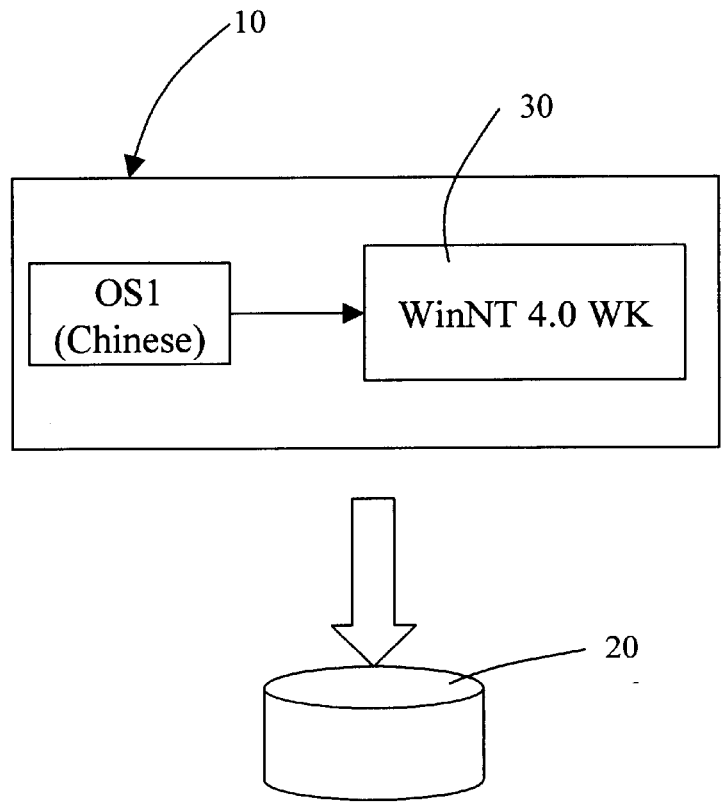
FIG. 5 is a block diagram showing hardware according to the present invention.

FIG. 5 illustrates the hardware for executing the preparation process according to the present invention. It includes:

A computer 10, incorporating an operation system 30, such as WinNT 4.0 WK, which supports Unicode, and at least a specific language (e.g. Chinese) system OS1 as slave of the operation system 30 for executing the previously mentioned data transformation process. So that, the specific language file names can be taken, stored with Unicode, and established as the matching table; and A recording medium 20, such as an optic disk or a magnetic disk, and accessible to the computer 10, for storing the matching table files (which includes matching tables and relative files) and the machine code instructions (driver program) for the computer 10 to execute a restoration. Therefore, after the Windows system crashes, the user can fast restore the Windows under the DOS system by using the data and the driver program.

Figure 2:
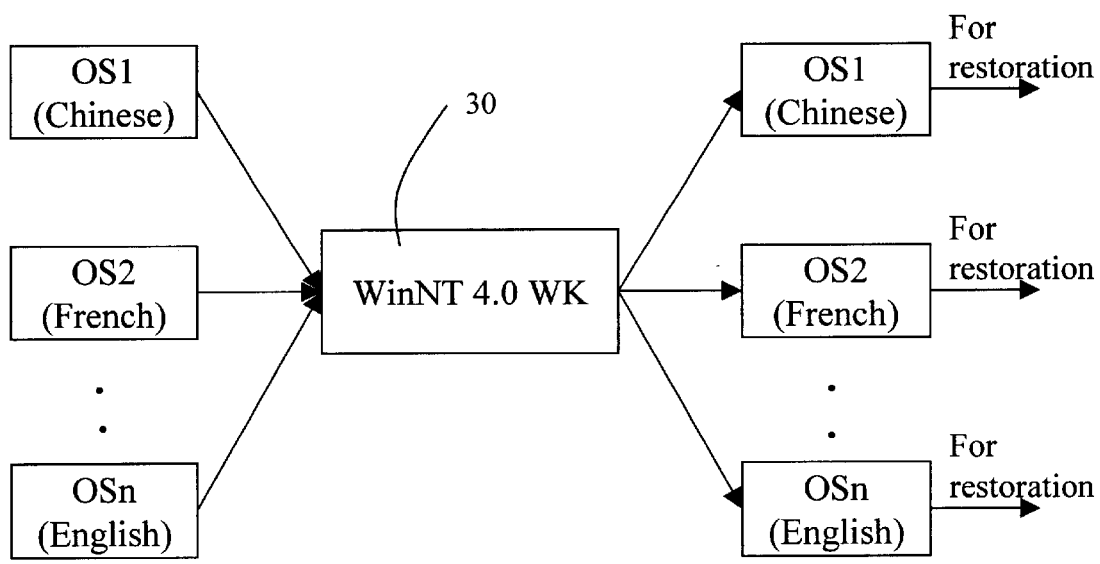
FIG. 2 is a functional block diagram showing data transformation according to the present invention.

As shown in FIG. 2, several different language systems OS1, OS2, . . . OSn, acting as, for example, Chinese, French, . . . English slaves of the WinNT 4.0 WK system 30, are used to establish matching table files of different language files via the Unicode operation system. The matching table files and machine code instructions are then stored on a medium (optic or magnetic disk, etc.) and will act as a restoration tool for the corresponding language operation systems OS1, OS2, . . . OSn when they corrupted.

The restoration process is actually a reverse procedure of the preparation process. This is to load the matching table files into the computer first, then to decompress them if they are compressed. Then using the matching table to generate a directory tree and the corresponding long file names of original specific language systems. After that, the operation system of the computer is restored to the original state.

The following is an example of the preparation process.

Figure 6:
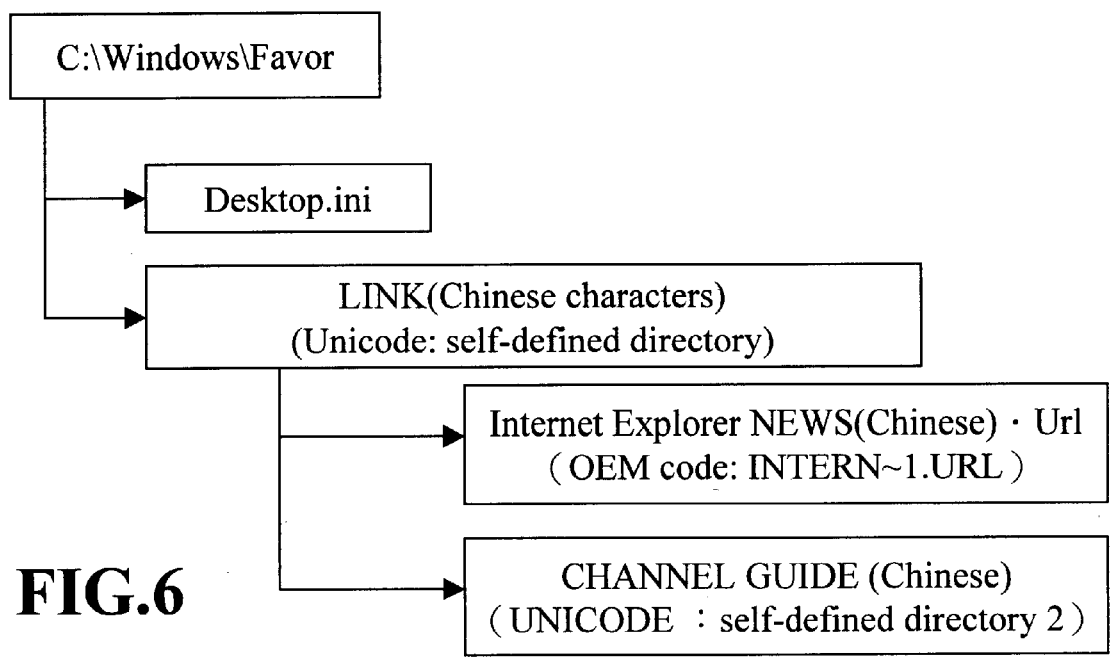
FIG. 6 is an example of file name searching and transformation according to the present invention.

As shown in FIG. 6, supposing a directory is found in the disk C under a Chinese version Win98 system, e.g., C:\Windows\Favor.

If a Chinese file name under an UK interprets the directory. English Window system, it will become "-" or "?" that will fail to be restored during reinstallation of the operation system. However, the process under to the present invention will solve the problem as described below.

First to establish the directory tree. Under the C:\Windows\Favor, searching if there is any file or directory. A file named desktop.ini" is found, and a directory with Chinese name of LINK is under the file. The directory LINK is judged of non-ASCII code since it is of Chinese characters. So, it is transformed into Unicode and labeled as a self-defined directory 1". In the matching table, a short file name of LINK is corresponding to the long file name self-defined directory 1", and the file attributes and parameters of the directory are also recorded. By further searching directories or files under the directory LINK, a file named Internet Explorer NEWS (in Chinese).url" is found. Because the dot "." exists, it is judged as a short file name, so it will be transformed by OEM code into a name of INTERN~1.URL". Another son directory with Chinese name of CHANNEL GUIDE is also found under the directory LINK. As the previously mentioned procedures, the directory CHANNEL GUIDE is judged of non-ASCII code. So, it is transformed into Unicode and labeled as a self-defined directory 2". (Actually, the Unicode of it will be retrieved into original Chinese name of CHANNEL GUIDE after restoration of the operation system.) In the matching table, a short file name of CHANNEL GUIDE is corresponding to the long file name self-defined directory 2". The process is repeated until all files and directories are found. Each time when a new directory is found, it is taken as a new start point of the searching process. Any directory on the same layer is also searched. In this example, no further directory exists, so the search ends, and the file establishment is finished. When a restoration is needed, the matching table file is then used to find out the original directory. Since the long file names are stored in Unicode, they accommodate the operation systems of any language.

The advantages of the present invention are:

1) The restoration of an operation system can be swiftly made under DOS system. It is convenient and simple to operate without any interaction requirement between the user and the restoration tool;

2) A storage and retrieval method for long file names is provided. It is workable for operation systems of any language. So those long file names of any specific language can be correctly recognized and retrieved.

Although the invention has been described under preferred embodiments, it is be understood by those skilled in the art that various changes may be made without departing from its scope.

We claim:

1. A method for restoring an extended operation system of a computer under a basic operation system of the same computer, to a previous state prior to a crash, comprising steps of:

1) searching all files, including directory names, from a disk which contains said extended operation system, and establishing a matching table file containing short file names and corresponding long file names; and 2) restoring said long file names from said short file names according to said matching table file, so as to solve a problem of said basic operation system that does not support long file names, and fast restore a crashed extended operation system upon said basic operation system;

wherein said searching and establishing process in step (1) further comprises steps of:

a) searching said disk using an inquiry term;
b) judging if a file exists, then proceeding to step (c) if yes, or proceeding to step (k);
c) judging if said file is a directory, then proceeding to step (d) if yes, or jumping to step (j);
d) judging if the name of said directory contains a dot "." format, then jumping to step (j) if yes, or proceeding to step (e);
e) connecting a short file name with said inquiry term;
f) generating a directory node for inserting a directory tree;
g) using said directory node as a father node for searching downward son directories;
h) searching said directory tree and establishing a matching table file;
i) searching said directory tree and modifying codes of special characters;
j) searching other files; and
k) completing the restoring operation.

2. A method for restoring an extended operation system of a computer according to claim 1 wherein said inquiry term in step (a) is a target file for inquiry.

3. A method for restoring an extended operation system of a computer according to claim 1 wherein said file in step (b) is any file and directory in said disk.

4. A method for restoring an extended operation system of a computer according to claim 1 wherein said connecting process in step (e) is to set said short file name as said inquiry term.

5. A method for restoring an extended operation system of a computer according to claim 1 wherein said searching process in step (g) is to use said directory node as a father node for searching downward son directories by repeating said steps (a) to (f), and generating a directory tree.

6. A method for restoring an extended operation system of a computer according to claim 1 wherein said searching and establishing process in step (h) further comprises steps of:
h1) judging if there is a directory in said directory tree, proceeds to step (h2) if yes, or jumps to step (i);
h2) searching all files in said directory and establishing a matching table file;
h3) judging if there is further a son directory, then proceeding to step (h4) if not, or jumping to step (5);
h4) judging if there is another directory on same level, then proceeding to step (h5) if yes, or jumping to step (i); and
h5) taking said directory as current" directory, and jumping to step (h2).

7. A method for restoring an extended operation system of a computer according to claim 6 wherein said matching table file in step (h2) comprises at least a matching table and corresponding files.

8. A method for restoring an extended operation system of a computer according to claim 7 wherein said matching table comprises file path, said short file name and said corresponding long file name, file attributes and relative file parameters.

9. A method for restoring an extended operation system of a computer according to claim 8 wherein said short file name contains file path, and said file name is in OEM code.

10. A method for restoring an extended operation system of a computer according to claim 8 wherein said long file name is in Unicode.

11. A method for restoring an extended operation system of a computer according to claim 10 wherein said Unicode of said long file name is obtained from data transformation by a WinNT 4.0 WK operation system which supports Unicode.

12. A method for restoring an extended operation system of a computer according to claim 6 wherein said searching and establishing process in step (h2) is to scan files under said directory and to establish said long file names and said short file names.

13. A method for restoring an extended operation system of a computer according to claim 12 wherein said short file name is modified according to a predetermined rule of encoding if said short file name is not of ASCII code.

14. A method for restoring an extended operation system of a computer according to claim 1 wherein said matching table file is compressed and stored in a recording medium which is readable by said computer.

15. A method for restoring an extended operation system of a computer according to claim 1 wherein said basic operation system is DOS.

16. A restoration tool, substantially of a recording medium readable by a computer for restoring an operation system of said computer, comprising:
a matching table file comprising at least a matching table of short file names to long file names, and corresponding files; and
machine code instructions for executing a restoration process based on said matching table file;
wherein said matching table comprises a file path, said short file name and said a corresponding long file name, file attributes and relative file parameters; and said short file name contains a file path, and said file name is in OEM code.

17. A restoration tool, substantially of a recording medium readable by a computer for restoring an operation system of said computer, comprising:
a matching table file comprising at least a matching table of short file names to long file names, and corresponding files; and
machine code instructions for executing a restoration process based on said matching table file;
wherein said matching table comprises a file path, said short file name and said a corresponding long file name, file attributes and relative file parameters; and
wherein said long file name is in Unicode.

* * * * *